(12) United States Patent
Beeler et al.

(10) Patent No.: US 8,913,647 B2
(45) Date of Patent: Dec. 16, 2014

(54) EMBEDDED META-CARRIER WITH CODE PROGRESSION MESSAGE REASSEMBLY

(71) Applicant: Comtech EF Data Corp., Tempe, AZ (US)

(72) Inventors: Michael Beeler, Jefferson, MD (US); Frederick Morris, Gathersburg, MD (US); Cris Mamaril, Mesa, AZ (US); Jeffery Harig, Mesa, AZ (US); Richard Hollingsworth Cannon, Mesa, AZ (US); Brian Banister, Moscow, ID (US)

(73) Assignee: Comtech EF Data Corp., Tempe, AZ (US)

( * ) Notice: Subject to any disclaimer, the term of this patent is extended or adjusted under 35 U.S.C. 154(b) by 0 days.

(21) Appl. No.: 14/253,653

(22) Filed: Apr. 15, 2014

(65) Prior Publication Data

US 2014/0226696 A1   Aug. 14, 2014

Related U.S. Application Data

(60) Division of application No. 13/218,849, filed on Aug. 26, 2011, now Pat. No. 8,699,545, which is a continuation-in-part of application No. 13/024,402, filed on Feb. 10, 2011, and a continuation-in-part of application No. 13/044,446, filed on Mar. 9, 2011, now Pat. No. 8,654,814, and a continuation-in-part of application No. 13/024,951, filed on Feb. 10, 2011.

(60) Provisional application No. 61/502,512, filed on Jun. 29, 2011, provisional application No. 61/389,130, filed on Oct. 1, 2010, provisional application No. 61/360,213, filed on Jun. 30, 2010, provisional application No. 61/322,257, filed on Apr. 8, 2010.

(51) Int. Cl.
*H04B 1/00* (2006.01)
*H04B 1/707* (2011.01)
*H04B 1/7097* (2011.01)
*H04L 27/34* (2006.01)

(52) U.S. Cl.
CPC .............. *H04B 1/707* (2013.01); *H04B 1/7097* (2013.01); *H04L 27/3488* (2013.01)
USPC .......................................... 375/140; 375/147

(58) Field of Classification Search
USPC .......... 375/130, 140, 141, 147, 316; 370/310, 370/345, 347
See application file for complete search history.

(56) References Cited

U.S. PATENT DOCUMENTS

| | | |
|---|---|---|
| 4,455,651 A | 6/1984 | Baran |
| 4,744,083 A | 5/1988 | O'Neill et al. |

(Continued)

FOREIGN PATENT DOCUMENTS

EP   1053600 B1   8/2006

*Primary Examiner* — Vineeta Panwalkar
(74) *Attorney, Agent, or Firm* — Booth Udall Fuller, PLC

(57) ABSTRACT

A method of receiving and reassembling non-sequential meta-data information embedded within an original burst carrier signal that receives multiple composite burst carrier signals each with an original burst carrier signal and a meta-carrier signal, wherein the meta-carrier signal occupies at least a portion of a bandwidth of the original burst carrier signal and includes one or more bits of meta-data information of a meta-data message about the original burst carrier signal that is non-contiguous in reference to a temporal order in which the meta-data information is received, detecting a DSSS spreading sequence and extracting the meta-carrier signals from the composite burst carrier signals, determining a phase progression of the meta-carrier signals based on a PRN spreading code, and reassembling the one or more bits of meta-data information from each meta-carrier signal into a sequential order after an entire meta-data message is received and extracted.

28 Claims, 14 Drawing Sheets

(56) References Cited

U.S. PATENT DOCUMENTS

| | | |
|---|---|---|
| RE32,905 E | 4/1989 | Baran |
| 5,048,015 A | 9/1991 | Zilberfarb |
| 5,245,612 A | 9/1993 | Kachi et al. |
| 5,420,883 A | 5/1995 | Swensen et al. |
| 5,537,397 A | 7/1996 | Abramson |
| 5,666,648 A | 9/1997 | Stuart |
| 6,020,845 A | 2/2000 | Weinberg |
| 6,147,640 A | 11/2000 | Wachs |
| 6,408,178 B1 | 6/2002 | Wickstrom et al. |
| 6,853,675 B1 | 2/2005 | Oleynik |
| 6,985,512 B1 | 1/2006 | McDermott et al. |
| 7,227,884 B2 | 6/2007 | McDermott |
| 7,433,391 B2 | 10/2008 | Stafford et al. |
| 7,596,170 B2 | 9/2009 | McDermott et al. |
| 8,054,865 B1 | 11/2011 | Frost |
| 2001/0024474 A1* | 9/2001 | Rakib et al. .......... 375/259 |
| 2002/0021721 A1 | 2/2002 | Jiang et al. |
| 2002/0072855 A1 | 6/2002 | Fuchs et al. |
| 2002/0126638 A1 | 9/2002 | Schilling |
| 2002/0126639 A1 | 9/2002 | Schilling |
| 2003/0058810 A1 | 3/2003 | Petronic |
| 2003/0181161 A1 | 9/2003 | Harles et al. |
| 2004/0259497 A1 | 12/2004 | Dent |
| 2006/0012376 A1 | 1/2006 | Furse et al. |
| 2006/0274865 A1 | 12/2006 | Arunachalam |
| 2007/0116325 A1 | 5/2007 | Rhoads et al. |
| 2007/0264939 A1 | 11/2007 | Sugar |
| 2008/0080737 A1 | 4/2008 | Rhoads et al. |
| 2008/0151832 A1 | 6/2008 | Iwasaki |
| 2009/0059850 A1 | 3/2009 | Jung et al. |
| 2009/0190634 A1 | 7/2009 | Bauch et al. |
| 2009/0323640 A1 | 12/2009 | Chakrabarti et al. |
| 2010/0002582 A1 | 1/2010 | Luft et al. |
| 2010/0291865 A1 | 11/2010 | Gore et al. |
| 2011/0002366 A1 | 1/2011 | Michaels et al. |

\* cited by examiner

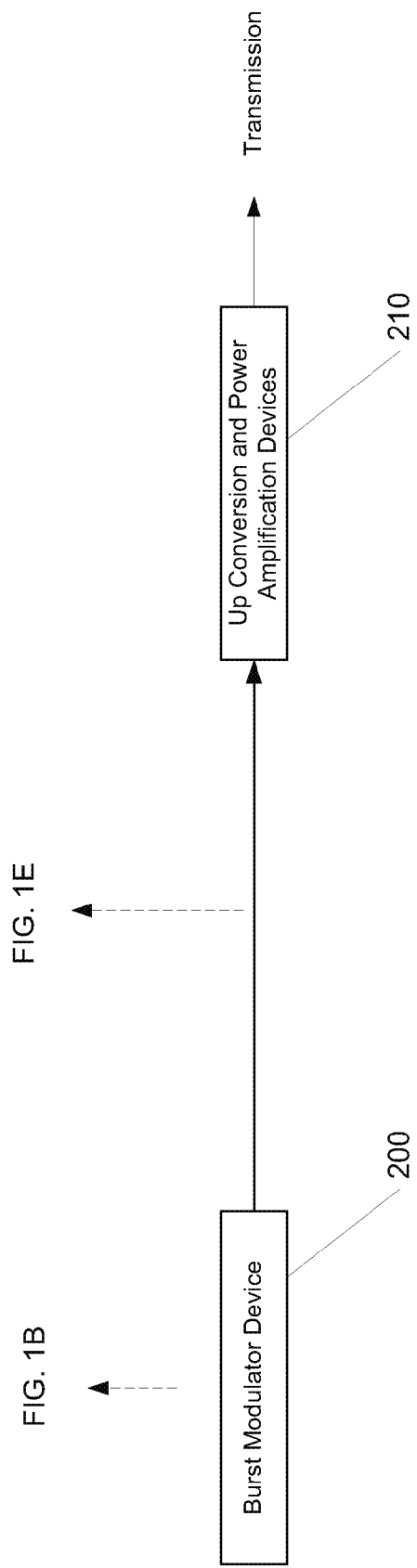

Carrier ID Power Spectral Density Reduction Calculator

User Input

| | |
|---|---|
| User Data Carrier Symbol Rate (9.6 Ksps to 63,000.0) | 256.000 Ksps |
| User Data Carrier C/N Max (0.2 to 40.0) | 10.0 dB |
| Noise Floor of System (-100.0 to 0.0) | -80.0 dB |
| Is Eb/No Information Known (Modulation and FEC Coding)? | Yes |
| Modulation Index (1/2/3/4/5) | 1 |
| FEC Code Rate | 0.5 |

User Input Required

Carrier ID Configuration

| | |
|---|---|
| Carrier ID Chip Factor | 2,048 |
| CID Carrier Chip Rate | 256.000 Kcps |
| CID Power Ratio | -22.000 dB |
| CID C/N | 0.1 dB |
| Scaling Ratio | 100.00% |
| Power Ratio Original Data Carrier to CID Carrier | 0.006310 |
| Noise Power including CID | 0.106310 |
| Difference between Original Data Carrier and CID Carrier | 9.9 dB |
| Spread Attenuation | -33.113300 dB |
| Spread Ratio | 0.000000 dB |
| Spread Correction | -33.113300 dB |
| Degraded C/N | 9.978845819 dB |

User Input Required

Degradation Output

| | |
|---|---|
| Input C/N | 10.0000 dB |
| Degradation due to CID Power Attenuation | -0.0273 dB |
| Degradation due to CID Carrier as Noise | -0.2657 |
| Output C/N | 9.7070 dB |
| Output Eb/No | 12.7173 dB |
| Total Degradation | -0.2930 dB |

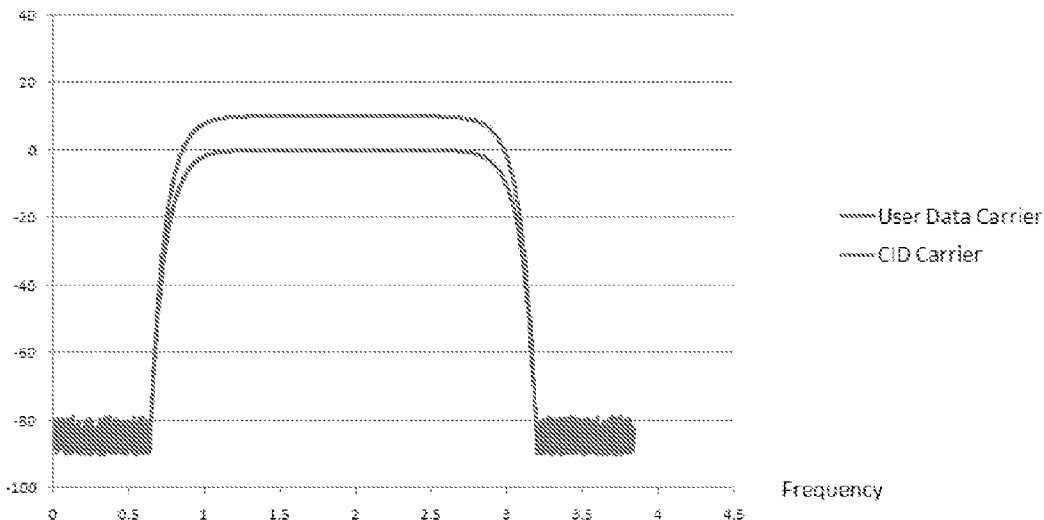

FIG. 3

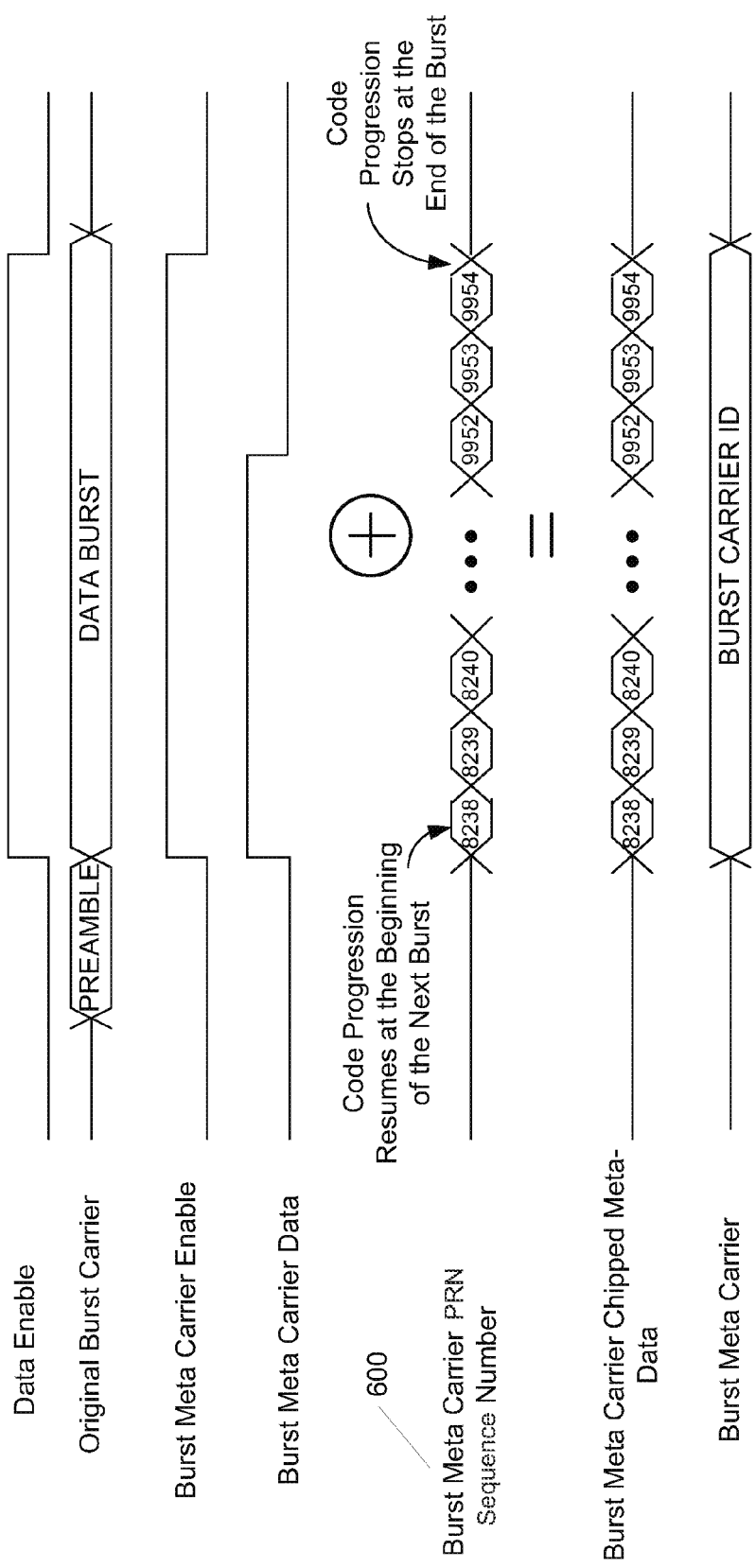

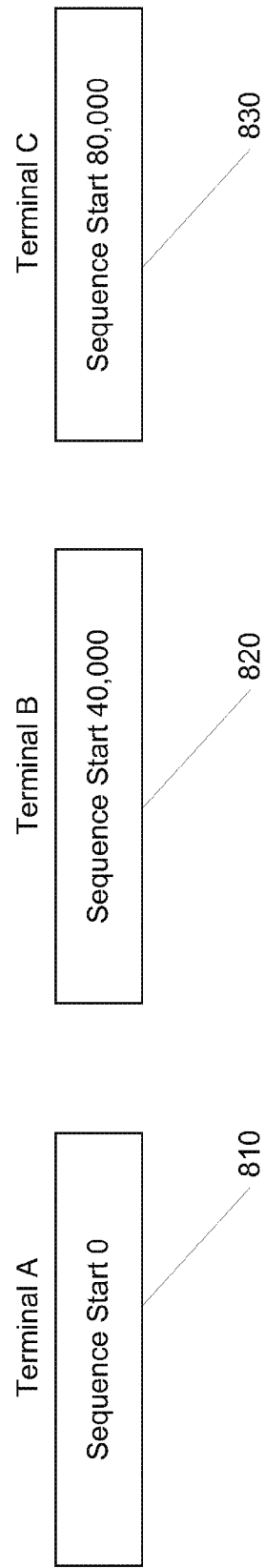

EMBEDDED META-CARRIER WITH CODE PROGRESSION MESSAGE REASSEMBLY

CROSS REFERENCE TO RELATED APPLICATIONS

This application is a divisional of currently pending U.S. patent application Ser. No. 13/218,849, entitled "Embedded Meta-Carrier with Code Progression Message Reassembly" to Michael Beeler et al., which was filed Aug. 26, 2011, which is a continuation in part of U.S. patent application Ser. No. 13/024,402, entitled "Embedded Meta-Carrier with Spread Spectrum Via Overlaid Carriers" to Michael Beeler, et al., which was filed on Feb. 10, 2011, pending U.S. patent application Ser. No. 13/044,446, entitled "Embedded Meta-Carrier with Spread Spectrum for Periodic-Burst Carriers via Overlaid Carriers" to Michael Beeler, et al., which was filed on Mar. 9, 2011, and U.S. patent application Ser. No. 13/024,951, entitled "A Method and System for Transmission of Identification via Metadata for Repeating Relays using Spread-Spectrum Technology" to Frederick Morris, et al., which was filed on Feb. 10, 2011, the disclosures of which are herein incorporated by reference in their entirety. The earlier U.S. patent application Ser. No. 13/218,849 also claims the benefit of the filing date of U.S. Provisional Patent Application No. 61/322,257, entitled "Embedded Meta-Carrier with Spread Spectrum via Overlaid Carriers" to Michael Beeler et al., which was filed on Apr. 8, 2010, U.S. Provisional Patent Application No. 61/389,130, entitled "Embedded Meta-Carrier with Spread Spectrum for Periodic-Burst Carriers via Overlaid Carriers" to Michael Beeler et al., which was filed on Oct. 1, 2010, U.S. Provisional Patent Application No. 61/360,213, entitled "A Method for Transmission of Identification via Meta-data for Repeating Relays Using Spread-Spectrum Technology" to Frederick Morris, et al., which was filed on Jun. 30, 2010, and U.S. Provisional Patent Application No. 61/502,512, entitled "Embedded Meta-Carrier with Code Progression Message Reassembly" to Michael Beeler, et al., which was filed on Jun. 29, 2011, the disclosures of which are hereby incorporated entirely by reference herein.

BACKGROUND

1. Technical Field

Aspects of this document relate generally to telecommunication systems and techniques for transmitting data across a telecommunication channel.

2. Background Art

Since the introduction of electromagnetic (EM) transmission, a recurring problem continuing to challenge the industry is the identification of the periodic-burst carrier. The problem is most prevalent in the Time Division Multiple Access (TDMA) Very Small Aperture Terminal (VSAT) satellite industry, but is not limited as such. The need to identify a carrier signal may be due to failed equipment that results in the transmission equipment transmitting or sweeping the wrong spectral location or locations. In this event, this carrier is known as a "rogue carrier." A second need to identify a carrier signal may be due to an improperly configured carrier signal. An improperly configured carrier signal is primarily due to human error. In many situations, the rogue or improperly configured carrier signal results in service disruption due to interference with a carrier signal assigned to operate in the same occupied spectrum. The methods described provide the ability for someone skilled in the art to rapidly identify the source of the interfering carrier signal using the methods described.

SUMMARY

Implementations of a method of embedding and transmitting a meta-data message in an original burst carrier signal for later message reassembly may comprise spreading a meta-carrier signal using a Direct Sequence Spread Spectrum spreading code having a Pseudo-Random Noise (PRN) spreading code sequence, the meta-carrier signal comprising one or more bits of meta-data information of a meta-data message about the original burst carrier signal and lowering a power spectral density (PSD) of the meta-carrier signal using the Pseudo-Random Noise (PRN) spreading code such that interference with the original burst carrier signal is reduced. The method may further comprise combining the original burst carrier signal and the meta-carrier signal using a modulator such that a composite burst carrier signal results wherein the meta-carrier signal occupies at least a portion of a bandwidth of the original burst carrier signal and transmitting the composite burst carrier signal using a transmitting device over a telecommunications channel in which only one burst carrier signal is expected to be present within a predetermined frequency bandwidth at a single point in time.

Particular implementations may comprise one or more of the following features. The telecommunications channel may be configured such that multiple burst carrier signals are present within different frequency bandwidths at the single point in time. The method may further comprise removing at least one of phase and time ambiguity of the meta-carrier signal based on a predetermined characteristic of the original burst carrier signal. The predetermined characteristic may be a preamble of the original burst carrier signal. The method may further comprise establishing a start time for the meta-carrier signal within the composite burst carrier signal based on a preamble of the original burst carrier signal. The PRN spreading code may further comprise a predetermined step in the PRN spreading sequence to indicate advancement to a next location in the meta-data sequence. The PRN spreading code may further comprise a fixed offset in the PRN spreading code sequence. The method may further comprise using a cyclic redundancy check (CRC) to determine one or more bit errors or gaps in the transmitted sequence. A chip rate of the meta-carrier signal may be equal to a symbol rate of the original burst carrier signal.

Implementations of a method of receiving and reassembling non-sequential meta-data information embedded within an original burst carrier signal may comprise receiving, by a receiving device, multiple composite burst carrier signals, each composite burst carrier signal comprising an original burst carrier signal and a meta-carrier signal, wherein the meta-carrier signal occupies at least a portion of a bandwidth of the original burst carrier signal and comprises one or more bits of meta-data information of a meta-data message about the original burst carrier signal that is non-contiguous in reference to a temporal order in which the meta-data is received by the receiving device, detecting, by a detecting device, a Direct Sequence Spread Spectrum (DSSS) spreading sequence and extracting the meta-carrier signals from the composite burst carrier signals, and determining a phase progression of the meta-carrier signals based on a Pseudo-Random Noise (PRN) spreading code. The method may further comprise storing the one or more bits of information from the meta-carrier signal in a storage device and reassembling the one or more bits of meta-data information from each meta-carrier signal into a sequential order after an entire meta-data message is received and extracted from one or more subsequently received composite burst carrier signals.

Particular implementations may comprise one or more of the following features. The method may further comprise establishing a start of the meta-carrier signal based on a predetermined characteristic of the original burst carrier signal. The method may further comprise generating one or more digital samples of the received meta-carrier signal using an analog to digital converter. The method may further comprise reprocessing incoming data stored by a recording device after detection of an error. The method may further comprise repetitively commanding stored incoming data to be iteratively output using a control device. The method may further comprise storing, by a storage device, received and demodulated portions of the PRN spreading code sequence. The method may further comprise determining whether at least a portion of an incoming meta-data message is available to combine with at least another portion of the incoming meta-data message using an iterative determination process. The method may further comprise outputting, by an output device, a meta-data message in response to obtaining an entire meta-data message. The PRN spreading code may further comprise a predetermined step in the PRN spreading code sequence configured to indicate advancement to a next location in the meta-data sequence. The PRN spreading code may further comprise a fixed offset in the PRN spreading code sequence. The method may further comprise Searching for one or more meta-data message bit segments containing one or more errors and establishing a probability of reassembly of the meta-data message when the one or more errors is corrected using an iterative process. The method may further comprise using a cyclic redundancy check (CRC) to determine one or more bit errors or gaps in the received meta-data sequence. A chip rate of the meta-carrier signal may be equal to a symbol rate of the original burst carrier signal. The method may further comprise verifying accuracy of a received meta-data message by referencing an external database.

Implementations of a system for embedding and transmitting a meta-data message in an original burst carrier signal for later message reassembly may comprise a first spreading device configured to spread a meta-carrier signal using a Direct Sequence Spread Spectrum (DSSS) spreading code having a Pseudo-Random Noise (PRN) spreading code sequence, the meta-carrier signal comprising one or more bits of meta-data information of a meta-data message about the original burst carrier signal and a second spreading device configured to lower a power spectral density (PSD) of the meta-carrier signal using the Pseudo-Random Noise (PRN) spreading code such that interference with the original burst carrier signal is reduced. The system may further comprise a modulator configured to combine the original burst carrier signal and the meta-carrier signal such that a composite burst carrier signal results wherein the meta-carrier signal occupies at least a portion of a bandwidth of the original burst carrier, and a transmitting device configured to transmit the composite burst carrier signal over a telecommunications channel in which only one burst carrier signal is present within a predetermined frequency bandwidth at a single point in time.

Particular implementations may comprise one or more of the following features. The telecommunications channel may be configured such that multiple burst carrier signals are present within different frequency bandwidths at the single point in time. The spreading device may be further configured to remove phase or time ambiguity of the meta-carrier signal based on a predetermined characteristic of the original burst carrier signal. The predetermined characteristic may be a preamble of the original burst carrier signal. The PRN spreading code may be configured to establish a start time for the meta-carrier signal within the composite burst carrier signal based on a preamble of the original burst carrier signal. The PRN spreading code may further comprise a predetermined step in the PRN spreading code sequence configured to establish a breakpoint in the PRN spreading code sequence to indicate advancement to a next location in the sequence. The PRN spreading code may further comprise a fixed offset in the PRN spreading code sequence. The system may further comprise a processing device configured to use a cyclic redundancy check (CRC) to determine one or more bit errors or gaps in the transmitted sequence. A chip rate of the meta-carrier signal may be equal to a symbol rate of the original burst carrier signal.

Implementations of a system for receiving and reassembling non-sequential meta-data information embedded within an original burst carrier signal may comprise a receiving device configured to receive multiple composite burst carrier signals, each composite burst carrier signal comprising an original burst carrier signal and a meta-carrier signal, wherein the meta-carrier signal occupies at least a portion of a bandwidth of the original burst carrier signal and comprises one or more bits of meta-data information of a meta-data message about the original burst carrier signal that is non-contiguous in reference to a temporal order in which the meta-data is received by the receiving device, a detecting device configured to detect a Direct Sequence Spread Spectrum (DSSS) spreading sequence and extracting the meta-carrier signals from the composite burst carrier signals, and a first processing device configured to determining a phase progression of the meta-carrier signals based on a Pseudo-Random Noise (PRN) spreading code. The system may further comprise a storage device configured to store the one or more bits of information from the meta-carrier signal and a second processing device configured to reassemble the one or more bits of meta-data information from each meta-carrier signal into a sequential order after an entire meta-data message is received and extracted from one or more subsequently received composite burst carrier signals.

Particular implementations may comprise one or more of the following features. The PRN spreading code may be configured to establish a start of the meta-carrier signal based on a predetermined characteristic of the original burst carrier signal. The system may further comprise an analog to digital converter configured to generate one or more digital samples of the received meta-carrier signal. The processor may be further configured to reprocess incoming data stored by a recording device after detection of an error. The system may further comprise a control device configured to repetitively command stored incoming data to be iteratively output. The system may further comprise a storage device configured to store received and demodulated portions of the PRN spreading code sequence. The processor may be further configured to use an iterative determination process to determine whether at least a portion of an incoming meta-data message is available to combine with at least another portion of the incoming meta-data message. The system may further comprise an output device configured to output a meta-data message in response to obtaining an entire meta-data message. The PRN spreading code may further comprise a predetermined step in the PRN spreading code sequence configured to establish a breakpoint in the PRN spreading code sequence to indicate advancement to a next location in the sequence. The PRN spreading code may further comprise a fixed offset in the PRN spreading code sequence. The processor may be further configured to search for one or more meta-data message bit segments containing one or more errors and establish a probability of reassembly of the meta-data message when the one or more errors is corrected using an iterative process. The processor may be further configured to perform a cyclic redundancy check (CRC) to determine one or more bit errors or gaps in the received meta-data sequence. A chip rate of the meta-carrier signal may be equal to a symbol rate of the original burst carrier signal. The processor may be further configured to verify accuracy of a received meta-data message by referencing an external database.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description , Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 2 is a block diagram of an implementation of a burst meta-carrier insertion modulator and transmitter configuration.

FIG. 3 is an example of a power budget showing degradation of the original burst carrier signal when combined with a burst meta-carrier signal to create a composite carrier signal.

FIG. 5-6 are timing diagrams showing an implementation of a method in which an initial and subsequent burst of meta-data is chipped with a burst meta-carrier PRN sequence, respectively, resulting in a burst meta-carrier spread sequence.

FIG. 8 is block diagram depicting an implementation of starting sequential offsets assigned to each transmission terminal upon initialization.

DESCRIPTION

Figure 1A:
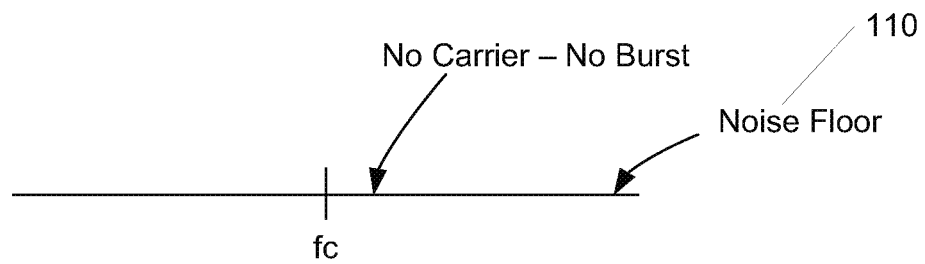
FIGS. 1A-E are representations of an embedded burst meta-carrier waveform.
Figure 1B:
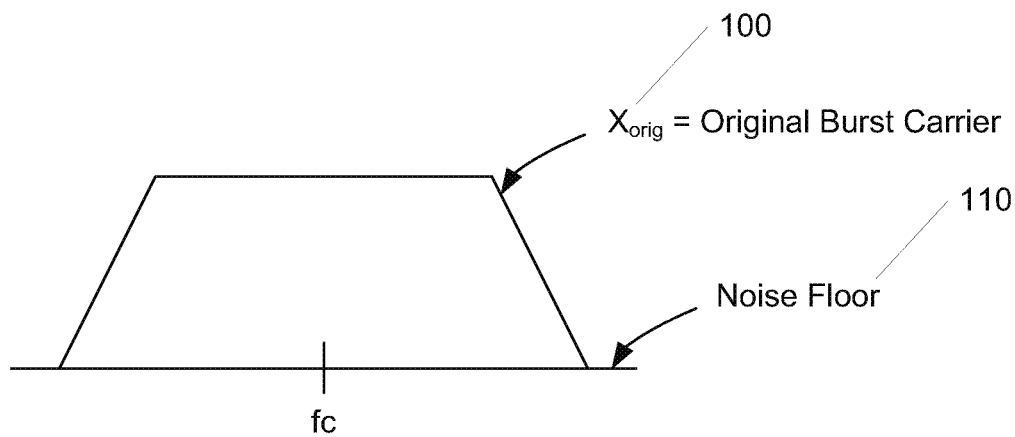
Figure 1C:
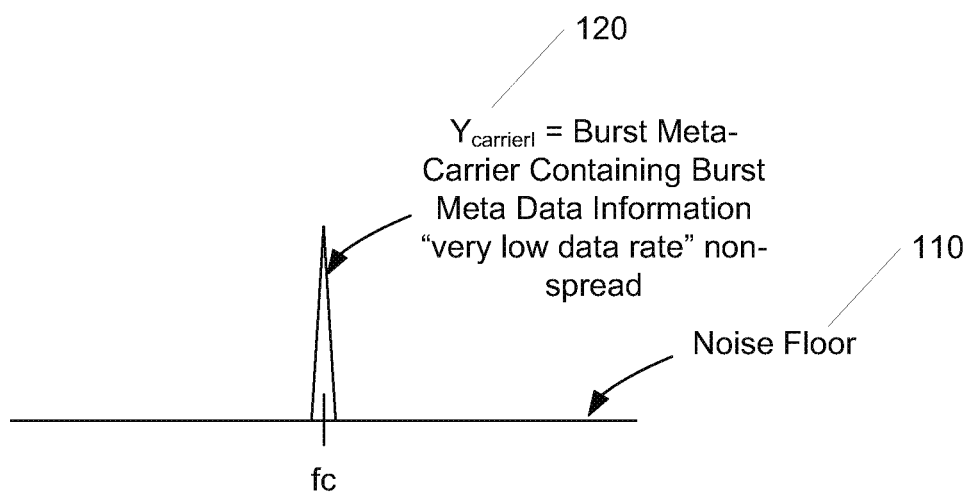
Figure 1D:
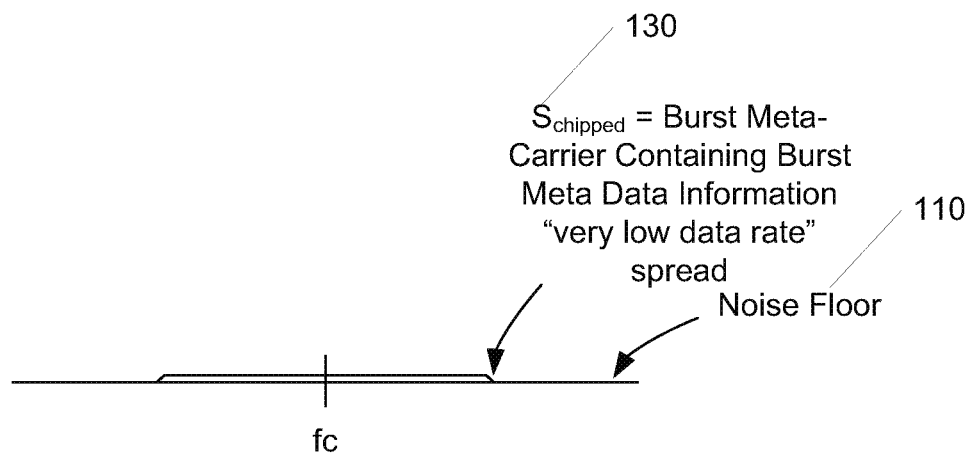
Figure 1E:
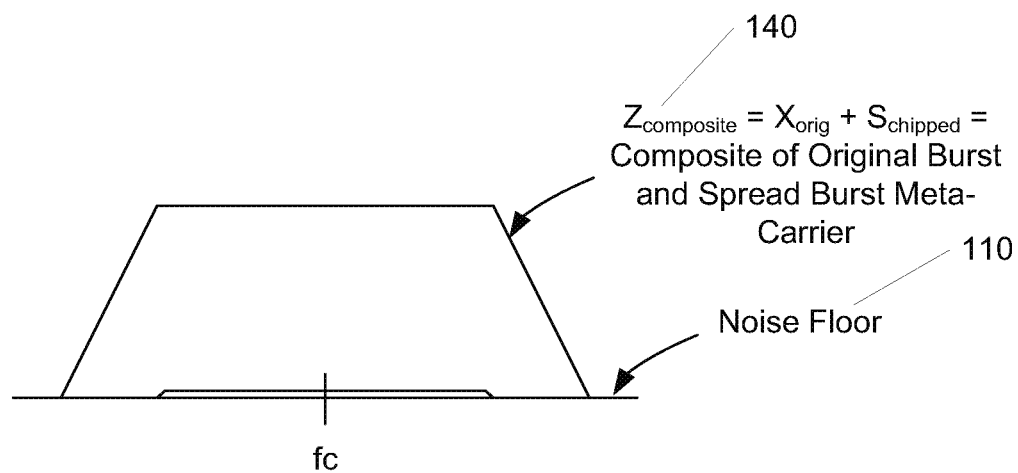

This disclosure, its aspects and implementations, are not limited to the specific components, frequency examples, or methods disclosed herein. Many additional components and assembly procedures known in the art consistent with embedding meta-data techniques for periodic-burst carriers are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Particular implementations of burst meta-carrier with message reassembly disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as cellular phone or terrestrial broadcast network without undue experimentation.

This disclosure relates to, but is not limited to the reassembly of meta-data from a burst type carrier signal using the contiguous nature of a PRN spreading sequence as a method for reassembly. As an additional embodiment, the burst metadata information may be replaced with telemetry, coordinate (latitude and longitude manually entered or provided by a Global Positioning System (GPS) automatically), user data, or any other relevant data. Particular implementations described herein are and may use, but are not limited to, Field-Programmable Gate Arrays (FPGA), Programmable Logic Devices (PLD), Programmable Integrated Circuits (PIC), Digital Signal Processors (DSP), Application Specific Integrated Circuits (ASIC) or microprocessors.

Implementations disclosed herein may rely on a shared medium using Time Division Multiple Access (TDMA). The use of burst-like TDMA allows a terminal to transmit a burst signal for a duration over a shared medium for a given time (number of symbols) either allocated explicitly (assigned) or allocated to a number of terminals (opportunistically) for bursting over the time (number of symbols) allocated medium (spectrum). The methods described herein use the concept of the meta-carrier signal containing meta-data about the original carrier signal to provide information to a monitoring device to determine the identification of the burst carrier signal. When using a TDMA architecture, the ability to transmit an entire message, that would be of use for identifying the source of the transmitter, may take more time (greater number of symbols) than would be allocated in a single TDMA burst. The described methods outline a mechanism for reassembling a non-contiguous message using the attributes of a spread spectrum sequence for re-assembling the individual bursts into a contiguous message for identifying the transmission sources over the shared medium.

Particular implementations of methods disclosed herein assume that the telecommunications channel may operate in a non-interfered configuration where each terminal bursts its information with no or minimal overlap, and in an interfered configuration where another terminal, using similar or different technology, may be occupying the medium thereby causing inband interference.

Aspects of this disclosure relate to a method and system for creating a composite burst signal from the original burst carrier signal and a burst meta-carrier signal for burst transmission and reception, burst demodulation, decoding and processing of the burst meta-carrier signal and the original burst carrier signal. Particular embodiments of the described methods use Direct Sequence Spread Spectrum (DSSS) techniques to address both the power spectral density mitigation of the burst meta-carrier signal and for the unique identification of the burst information for the processing and reassembly of the received meta-data messages.

Particular implementations of methods disclosed herein pertain to embedding information into a periodic-burst carrier signal to help identify an electromagnetic transmission's origin. In a burst-carrier environment, the duration of the burst is small; typically, but not limited to, tens to a few thousand modulated symbols in duration, so the amount of information transmitted may be a limited number of bits, e.g. less than 5 to 10 bits. The ability to detect a burst carrier signal and provide information about the burst carrier signal such as, for example, information about the transmission equipment (manufacturer, model, serial number, configuration, etc.), may thereby provide identification as to the source of the burst carrier signal's transmission. Methods may be employed for an electromagnetic emitting device that uses periodic-bursts, such as optical or Radio Frequency (RF) transmission equipment for point-to-point, point-to-multi-point and/or multipoint-to-multipoint for embedded information. This application hereby incorporates entirely by reference, pending U.S. patent application Ser. No. 13/024,402, entitled "Embedded Meta-Carrier with Spread Spectrum Via Overlaid Carriers" to Michael Beeler, et al., which was filed on Feb. 10, 2011; pending U.S. patent application Ser. No. 13/044,446, entitled "Embedded Meta-Carrier with Spread Spectrum for Periodic-Burst Carriers via Overlaid Carriers" to Michael Beeler, et al., which was filed on Mar. 9, 2011; U.S. Pat. No. 5,245,612, entitled "Spread Packet Communication System" to Seiji Kachi, et al., which was issued on September 14, 1993; U.S. Pat. No. 5,537,397, entitled "Spread Aloha CDMA Data Communications" to Norman Abramson, which was issued on Jul. 16, 1996; U.S. Pat. No. 6,985,512, entitled "Asynchronous Spread-Spectrum Communications" to Scott McDermott, et al. which was issued on Feb. 28, 2000; U.S. Pat. No. 7,433,391, entitled "Spread-Spectrum Receiver with Fast M-Sequence Transform" to James F. Stafford, et al. which was issued on Mar. 3, 2007; and U.S. Pat. No. 7,227,884, entitled "Spread-Spectrum Receiver with Progressive Fourier Transform" to Scott McDermott, et al. which was issued on Jul. 31, 2002.

Implementations of a method for embedding information about the burst carrier signal may be accomplished using a Pseudo-Random Number (PRN) like sequence as a code sequence for providing a chipping sequence for producing a spread spectrum signal. The PRN-like code sequence is used for chipping the meta-data to first lower the Power Spectral Density (PSD) of the meta-carrier signal containing the meta-data sequence to a level that provides minimal impact to the original burst carrier signal that the burst meta-carrier signal is being combined with. Secondly, the code sequence acts as a progression mechanism as to where a burst is in the PRN code sequence which is later employed for reassembly of the meta-data sequence at the receiving end of the link.

The embedded DSSS meta-carrier signal may be time and phase aligned with the original burst carrier signal's preamble sequence, thus removing any phase ambiguity at the receiving device, thereby resulting in lower processing time and less searching for the embedded meta-carrier signal sequence under the original burst carrier signal.

The methods described herein may use a sequential sliding approach in which the code sequence progresses one chip at a time through the code epoch, a step-sliding sequence in which the code will be advanced to the next known point in the code, or a step-sliding sequence with unique offset in which the code will be advanced to the next known point in the code for rapid detection by the remote receiving device. The progression through the code sequence is directly proportional to the amount of time the burst aperture remains open.

Described methods may assume the meta-carrier signal's data rate is a fraction of the data rate of the original-burst carrier signal's data rate. Combining the meta-carrier signal's spread spectrum carrier signal with the original-burst carrier signal results in a combined composite carrier signal that may be delivered to the original-burst carrier signal's demodulators with minimal impact to the signal quality while carrying information about the burst transmit terminal that may be extracted by a meta-carrier decoding device.

The decoding device may be a real time or non-real time processing device that receives the periodic composite burst signals and beings processing the burst signals upon receipt when operating in real-time mode or digitizes the burst signals for storage and processing at a later time for non-real time processing. The decoding process may assume a priori knowledge of the original burst carrier signal's preamble and determines the preamble section of the burst signal to ascertain the proper time and phase alignment to prepare for the reception of the embedded burst-meta carrier signal.

FIGS. 1A-E illustrate a particular implementation of a burst transmission carrier wherein the output has been modulated to IF/RF. In these diagrams, the output of the modulating equipment contains a single modulated carrier $x_{orig}(t)=A_I \cos(\omega_c t)+A_Q \sin(\omega_c t)$ as represented as $X_{orig}$ and does not necessarily contain information about the origin, configuration, etc. of the source transmission, or any embedded information. FIGS. 1A-E and FIG. 2 illustrate a burst carrier signal (non-continuous) where the carrier signal is only present when user information must be transmitted. When no user information is to be transmitted, the carrier signal is in an "off," or "muted," configuration. In a muted configuration, no original burst carrier signal or burst meta-carrier signal is output. In a prior application related application, the burst meta-carrier signal method is described in a non-limiting manner. However, the duration of the transmission (time duration of the carrier signal) is specifically addressed, and the method addresses the short duration (time or number of symbols) needed to determine if the duration of the transmit burst is usable for the embedding (combining) of the meta-carrier information into the burst. In the present description, the ephemeral nature of the "burst carrier signal" is directly addressed and provisions are made to directly know the duration of the burst signal either through a priori knowledge provided by a hub/controller burst time planner, which is responsible for instructing each terminal when to start and stop bursting, or by knowing the allocation of available duration of burstable time (or number of symbols) and knowing the backlog of user data that would be required for purging the queue where user data is being stored.

The prior related applications referenced above describe the concept of the meta-carrier signal (both continuous and burst), but neither describe the method of insertion of the meta-carrier signal to ensure alignment to the original carrier signal and re-assembling a message due to fragmentation of the burst nature of the burstable (TDMA) carrier.

When the burst meta-carrier signal is utilized, the duration of a burst carrier signal must be kept as short and confined as possible, since the communication channel may be shared by many other communications terminals (burst carrier signals) over an allocated spectrum. The present methods ensure that the meta-carrier signal is rapidly muted upon direction such that the transmit aperture is no longer present. The burst carrier signal's short duration (ephemeral existence) requires a method that is described in this application. In the particular implementation illustrated in FIGS. 1A-E, the carrier information is shown as a low-rate (non-spread) carrier, $y_{CarrierI}(t)=B_I \cos(\omega_c t+\phi_c)+B_Q \sin(\omega_c t+\phi_c)$, as represented as $Y_{CarrierI}$ 120, prior to being spread.

The creation of the meta-carrier signal using the methods disclosed herein assumes that the original carrier signal and meta-carrier signal are created in a collocated process as shown in FIG. 2. Keeping the processes collocated allows the information that is utilized to create the original burst signal to be used for creating the meta-carrier burst. The symbol rate and proper power are assumed to be a priori, so the appropriate chip rate may be applied in the burst modulator 200 and the proper power set prior to upconversion and power amplification 210 to ensure the resulting power spectral density (PSD) results in minimal impact to the original carrier signal as show in FIG. 3.

In one implementation, Binary Phase Shift Keying (BPSK) may be used as the modulation format of the burst meta-carrier signal, however, one of ordinary skill in the art would recognize that this disclosure is not limited as such. Once the low-data rate burst meta-carrier signal 120 is spread or chipped, the waveform may be the spread burst meta-carrier signal 130 and represented as $s_{chipped}(t)=Bchipped_I \cos(\omega_c t+\phi_c) + Bchipped_Q \sin(\omega_c t+\phi_c)$, which is transmitted at a power level that is very close to the noise floor 110. As one skilled in the art would refer, the low-data rate spread burst meta-carrier signal is then combined (IF or RF) with the original burst carrier signal to create a composite burst carrier signal 140 also shown in FIGS. 1A-E as $Z_{composite}=X_{orig}+S_{chipped}$. Therefore, knowing the energy of the signal to noise density of the original burst carrier 100 $X_{orig}$(Es/No) of $X_{orig}$, and knowing the processing gain $G_p$ of a low data rate burst meta-carrier signal 120 that has been chipped to become a chipped meta-carrier signal 130, $S_{chipped}$, which is 10 Log $(BW_{RF}/Data_{CarrierID})$, such that the result is a signal that has been chipped by many tens, hundreds, thousands, or even millions of times, and the ratio of $X_{orig}$ to $S_{chipped}$ is many times greater than $X_{orig}$. The $BW_{RF}$ bandwidth may be the 3 dB or 99% bandwidth of the chipped waveform. For example, assuming an original burst carrier 100 with a $BW_{RF}$ of 256 KHz is provided with a burst duration of 20 milliseconds, and the burst meta-carrier signal 130 uses a spread factor of 2048, the processing gain $G_p$ with a spread factor of 2048 can be expressed in Decibels (dB) as 10 Log (2048)=33.11 dB. The duration of 20 milliseconds would support a message operating at 256 Ksps for a duration 20 milliseconds (5,120 symbols) to be transmitted where the meta-carrier signal may be embedded. As a second example, assuming an original burst carrier signal 100 with a $BW_{RF}$ of 512 KHz is detected with a burst duration of 10 milliseconds, and the burst meta-carrier signal uses a spread factor of 1024, the processing gain $G_p$ with a spread factor of 1024 can be expressed in Decibels (dB) as 10 Log (1024)=30.10 dB. The duration of 10 milliseconds (5,120 symbols) supports a transmission in which the meta-carrier signal may be embedded.

Again, if one assumes the $X_{orig}$ original burst carrier signal's Es/No is 10 dB, and burst meta-carrier signal $S_{chipped}$ has a spreading attenuation of 33.11 dB relative to $X_{orig}$, the resulting Ec/No=Es/No−10*Log (2048)=10 dB−33.11 dB=−23.11 dB Keeping the low-data rate burst meta-carrier signal information rate constant allows the original burst carrier signal with more bandwidth to always have higher Es/No properties, resulting in the spread burst meta-carrier signal appearing as low-level noise, thus minimally, if at all. The total degradation of the Es/No of the original burst carrier $X_{orig}$ can be observed on FIG. 3 as the Total Degradation of -0.2930 dB.

The resulting burst meta-carrier signal may be inserted under the original carrier signal and extended to the 3 dB (99% bandwidth) roll-off points of the original carrier signal. The burst meta-carrier signal information to be embedded into the original burst carrier signal may be provided in a multitude of ways, but is not limited to the methods described herein.

Figure 4:
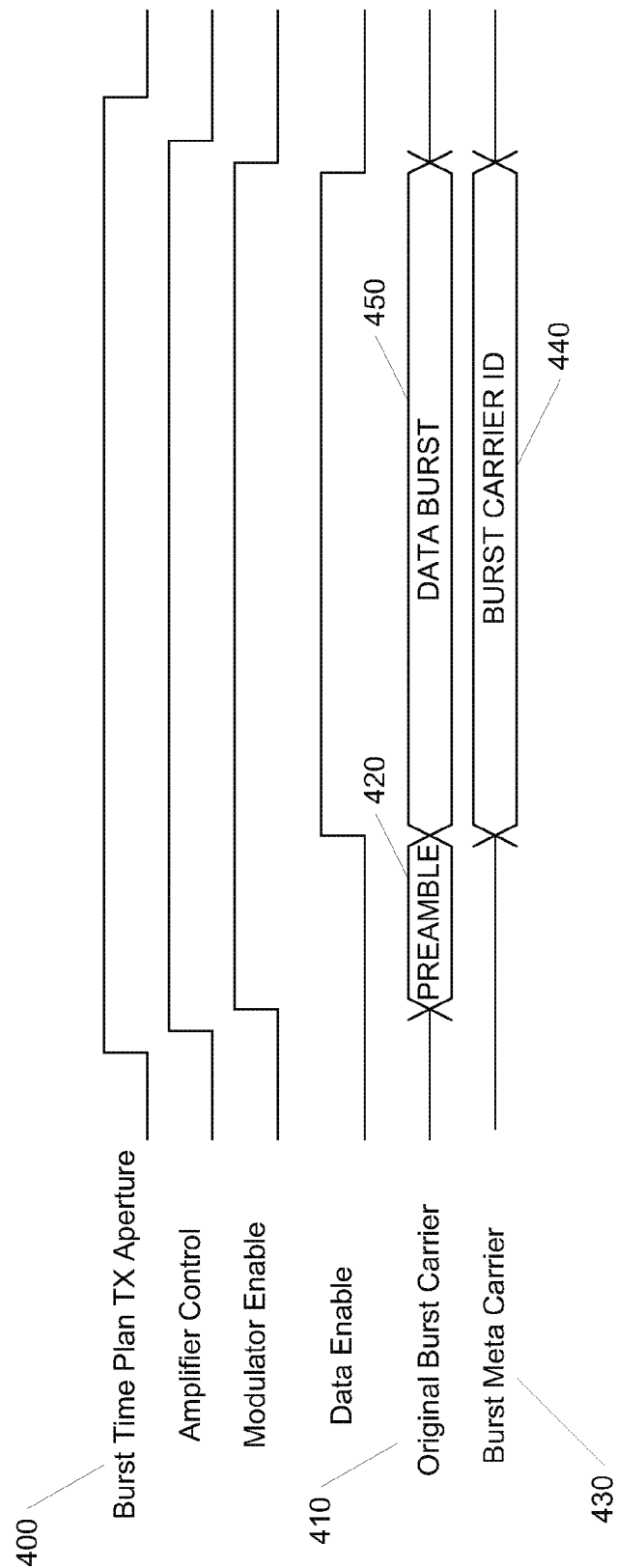
FIG. 4 is a timing diagram showing an example of where a burst meta-carrier signal may be placed in a transmission sequence.

A particular method implementation requires information about the duration of the burst to determine whether a burst is a candidate to have a meta-carrier signal embedded within the original carrier signal. A burst that contains a fewer than a minimum required number of symbols may not be considered as a burst to have the meta-carrier signal embedded. Above this minimal threshold, the burst may then have the meta-carrier signal embedded within the original burst carrier signal to form a composite carrier signal. FIG. 4 shows the Burst Time Transmit (TX) Aperture burst duration 400 as a start and stop time where the terminal may begin to transmit and then stop transmitting. A check may be performed to determine if the time duration (number of symbols) is below the threshold, and if it is, then no meta-carrier signal is transmitted. As an example, a 256 Ksps carrier signal requires that the minimum threshold to transmit a meta-carrier signal is six (6) data bits to be transmitted in the burst carrier signal, and then the duration may be determined as follows:

Minimum number of bits to be transmitted: 6
Carrier Symbol Rate: 256 Ksps
Chip rate for Meta-Carrier: 224 Kcps
Spread Factor: 2048

The minimum duration of the burst carrier signal transmitting six (6) bits is:

6 bits*(2048 chips/bit/224 Kcps)=54.8 mS or 14,043 symbols

As a second example using a different spread factor, a 256 Ksps carrier requires that the minimum threshold to transmit a meta-carrier is six (6) data bits to be transmitted in the burst carrier signal, and then the duration may be determined as follows:

Minimum number of bits to be transmitted: 6
Carrier Symbol Rate: 256 Ksps
Chip rate for Meta-Carrier: 224 Kcps
Spread Factor: 1024

The minimum duration of the burst carrier signal transmitting for six (6) bits is:

6 bits*(1024 chips/bit/224 Kcps)=27.4 mS or 7,021 symbols

Figure 5:
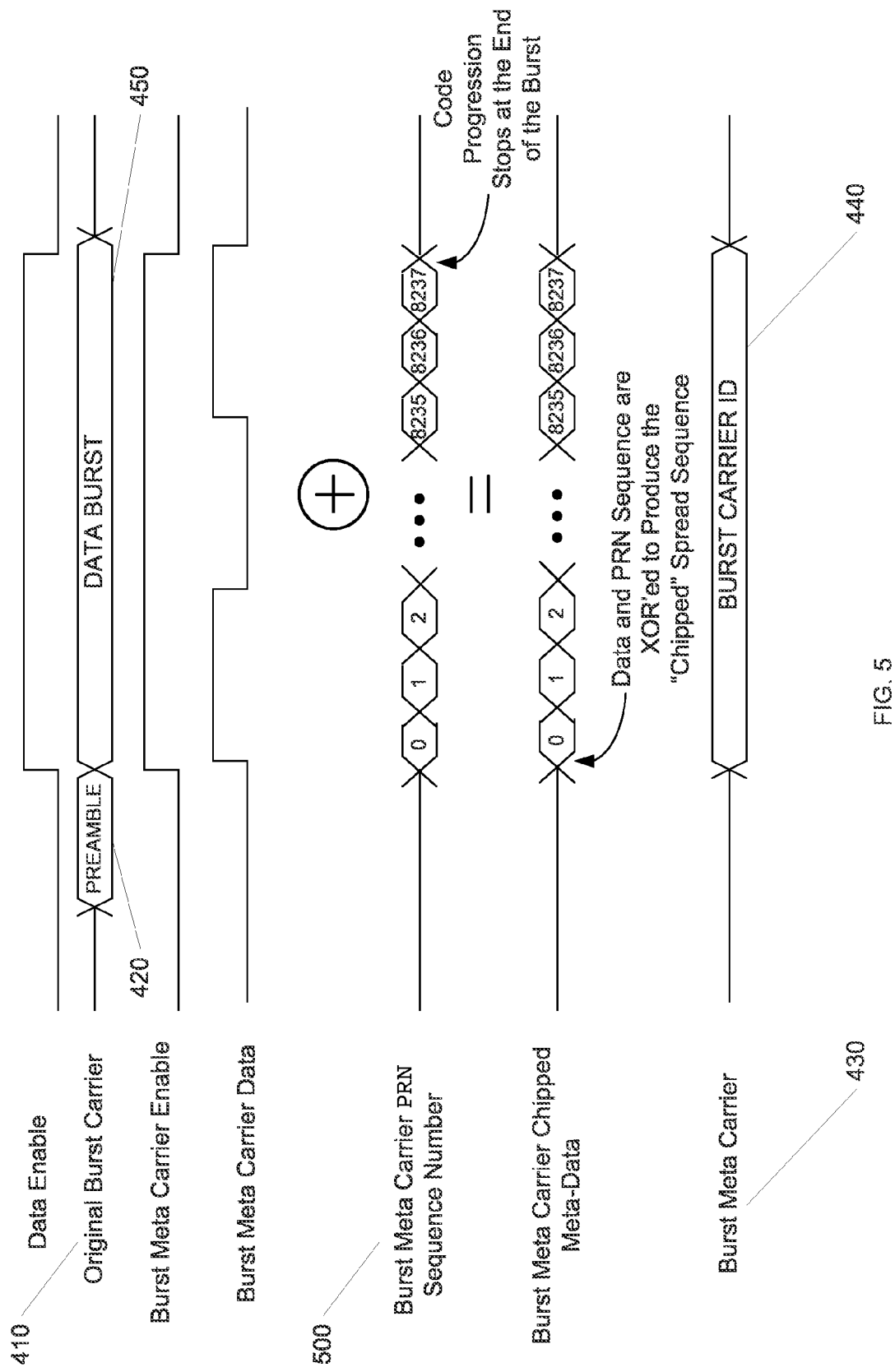

The method uses the preamble 420 of the burst carrier signal 410 to remove the phase and timing ambiguity at the receiving decoding device. FIG. 4 shows the start of the meta-carrier signal 430 data 440 begins at the end of the transmission of the preamble 420. In an alternate embodiment, the burst meta-carrier signal 430 information 440 may be started during the transmission of the preamble 420. FIG. 5 shows the how the meta-data is then chipped using the PRN sequence and the resulting chipped meta-carrier signal sequence modulated and combined with original carrier signal.

As shown in FIG. 5 in a particular embodiment, the PRN spreading sequence is used to reassemble the non-contiguous meta-data as it is received. The first burst carrier signal PRN sequence 500 shown in FIG. 5 ends with the progression of 8237, and FIG. 6 begins with the progression of 8238 as the second burst carrier signal's PRN sequence 600. The code progression through the sequence continues in this manner with each successive burst carrier signal. Each burst may be a different size and the progression through the code continues as each burst takes place from the burst transmit terminal. In an alternate embodiment, the burst meta-carrier signal 430 information 440 may be started during the transmission of the preamble 420.

Figure 11:
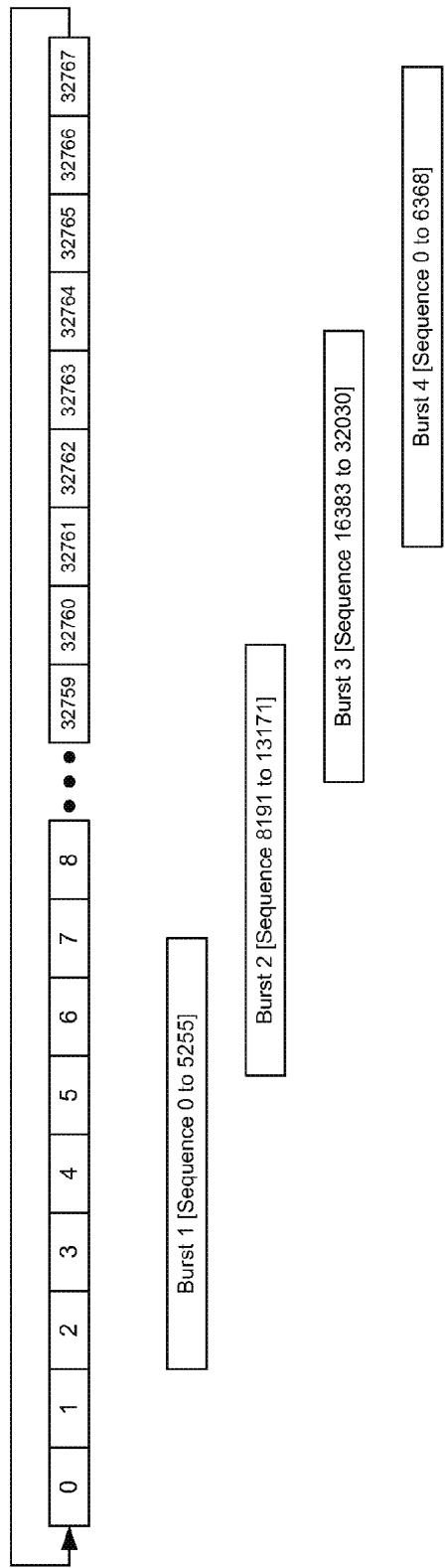
FIG. 11 is a diagram of an implementation of fixed stepping of a PRN sequence for each burst in which a 2^15 PRN code is broken into eight (8) sections.
Figure 12:
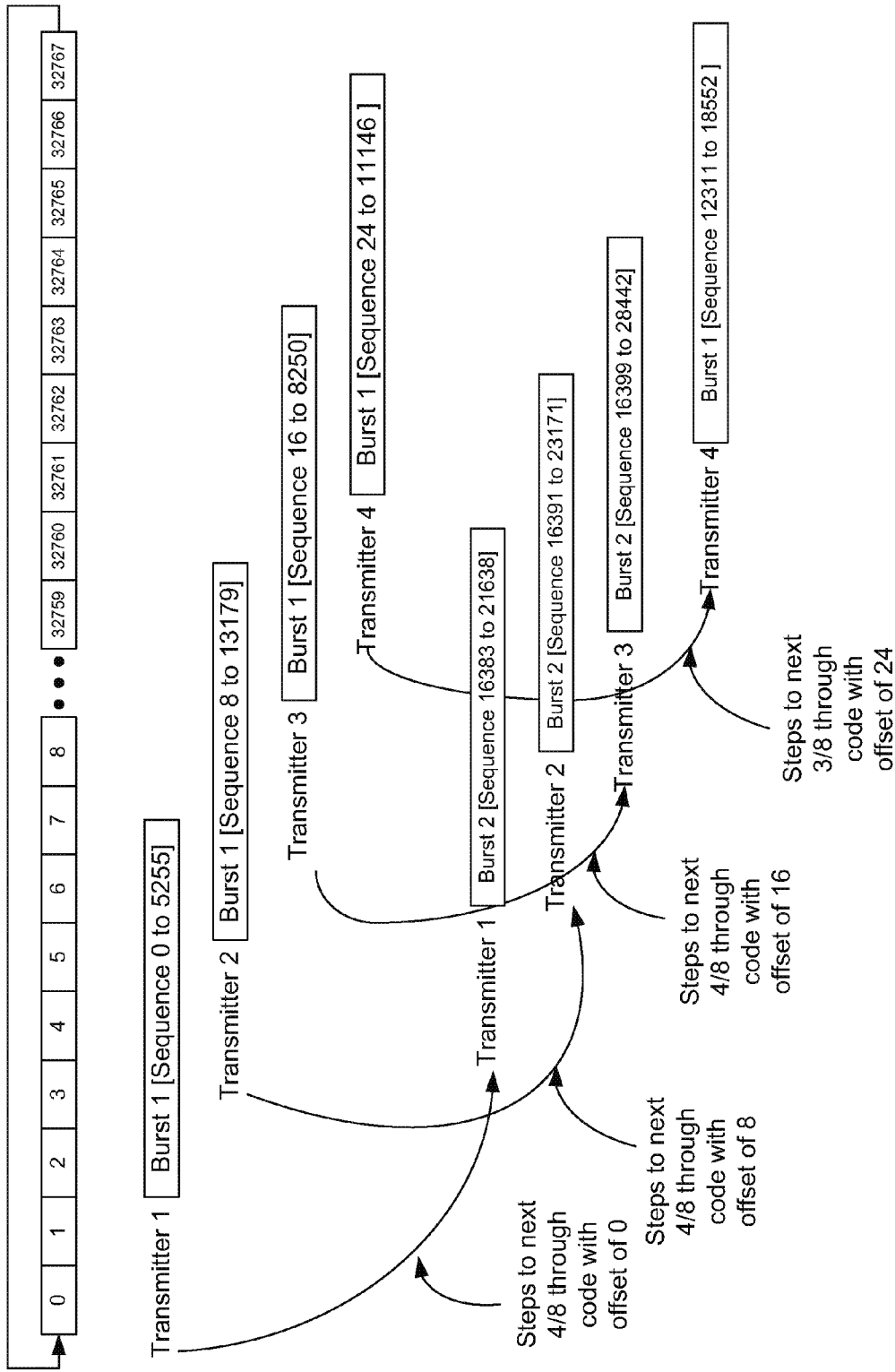
FIG. 12 is a diagram of an implementation of fixed stepping of a PRN sequence for each burst in which a 2^15 code is broken into eight (8) sections and each transmitter has a fixed offset at the start of each burst.

In a particular embodiment, the code progresses sequentially through the PRN code epoch as is shown in FIGS. 4-5, 7A-B and 10, where the burst carrier signal ends at one point in the code epoch and resumes at the next sequential point in the epoch on a subsequent burst. In an alternate embodiment as shown in FIGS. 11-12, each burst carrier signal may step a fixed distance through the code such that instead of resuming the next sequential position in the code epoch, the code resumes in the next predefined location (next segmentation point) that is assigned to the terminal. Using this mechanism reduces the search time at the receiving (decoding) device, since the last known location results in a priori information directing the decoding device as to where in the sequence to start looking for the next burst carrier signal. FIG. 8 depicts a starting offset 810, 820, 830 in the PRN sequence for each of three transmission terminals using a particular method implementation.

To ensure that burst carrier signals may be reconstituted at the receiver (decoding device), numerous methods may be brought to bear to ensure burst correlation. To ensure code phase distributions of the numerous burst transmit terminals, a long code may be used, such as, for example, a code on the order of many times the burst length. As a non-limiting example, a message of 32 bits (4 bytes) requires 65,536 chips to be received, so a PRN code of $2^{24}$ (16,777,216) would have a 1/256 (0.39%) probability of overlap if the codes were distributed uniformly among the transmission sites. In a particular embodiment, each burst device may be instructed to start at a known code offset for each transmission. In this embodiment, each burst carrier signal is stepped to the next known offset (unique to each site) at the beginning of each burst.

At the embedding device (the modulator), upon notification that a burst length is suitable for inserting a portion or all of the meta-data, the PRN sequence generator starts chipping the data after the preamble 420 of the original burst carrier signal is complete and the original burst carrier signal's data 450 is being transmitted. The meta-data 440 continues to be transmitted for the duration of the original burst carrier signal's data 450 being transmitted. Upon closure of the transmit aperture, the progression through the PRN sequence stops, and if the transmitter is operating in sequential sequence mode, the PRN code stops at that location. Upon the next transmit cycle, the PRN code resumes. If the transmitter is operating in stepped mode, then the PRN code is advanced to the next known break point location in the PRN code as shown in FIG. 11, and if there is an offset, then an offset is applied as shown in FIG. 12. Both FIGS. 11 and 12 have a fixed step size of eight to advance the code to the next break point in the PRN sequence, however, this disclosure is not intended to be limited as such. An alternative embodiment may use a signaling mechanism to instruct the transmitters where to start their offsets to ensure burst uniqueness for meta-data reassembly.

The information 440 contained in the burst meta-carrier signal 430 may be small since the duration of a burst is typically small (limited number of symbols). Therefore, the information 440 contained in the burst meta-carrier signal 430 may be limited to a manufacturer identification, model number and serial number, or any other relevant information. The entire identification sequence may be limited to, for example, only 24 bits (or 3 bytes), and an allocation for one byte for Cyclic Redundancy Checking (CRC) for a total meta-data frame of 32 bits (or 4 bytes).

Figure 7A:
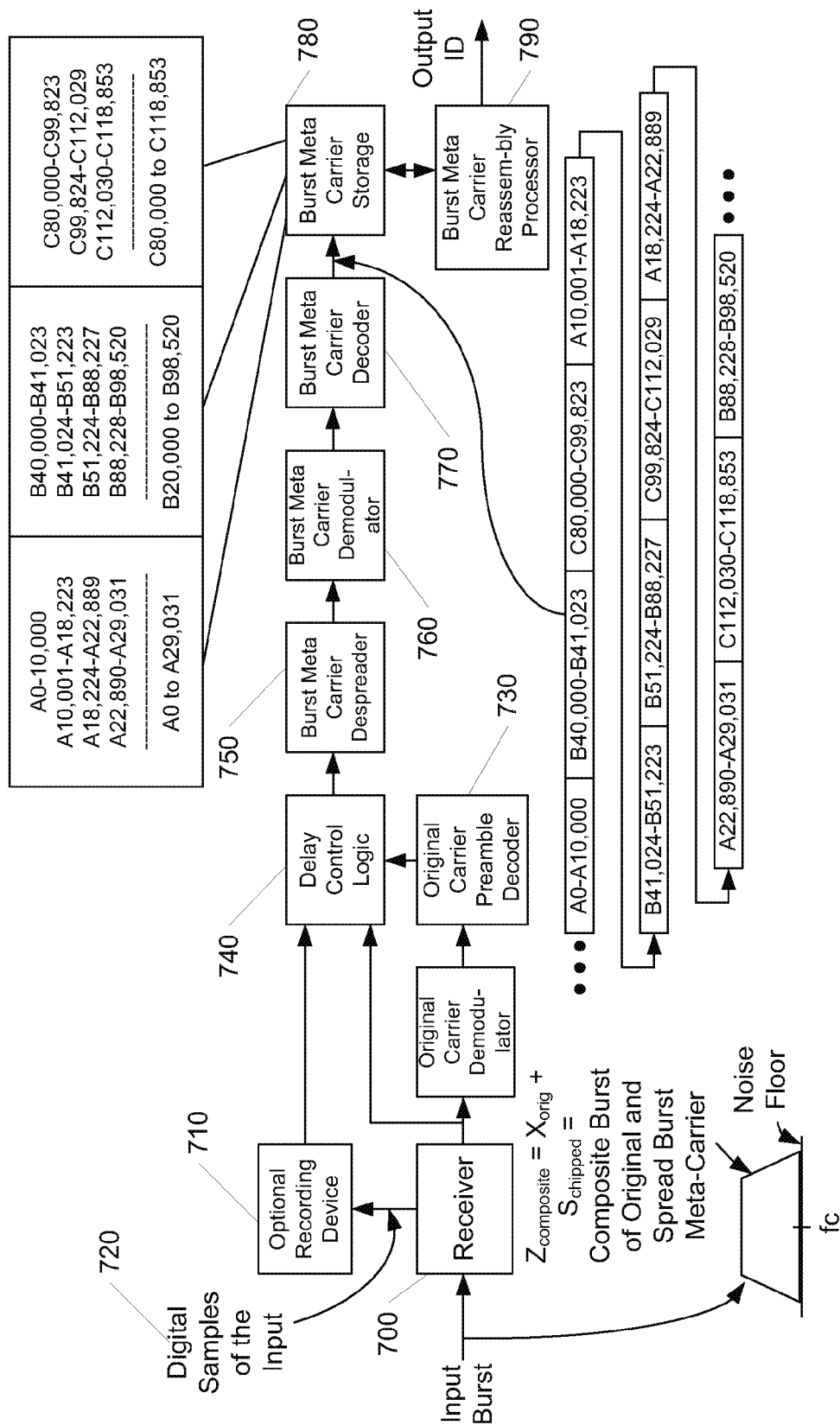
FIGS. 7A and 7B are block diagrams of an implementation of a burst meta-carrier receiving and processing device using an implementation of a method for reassembly of non-contiguous messages.
Figure 7B:
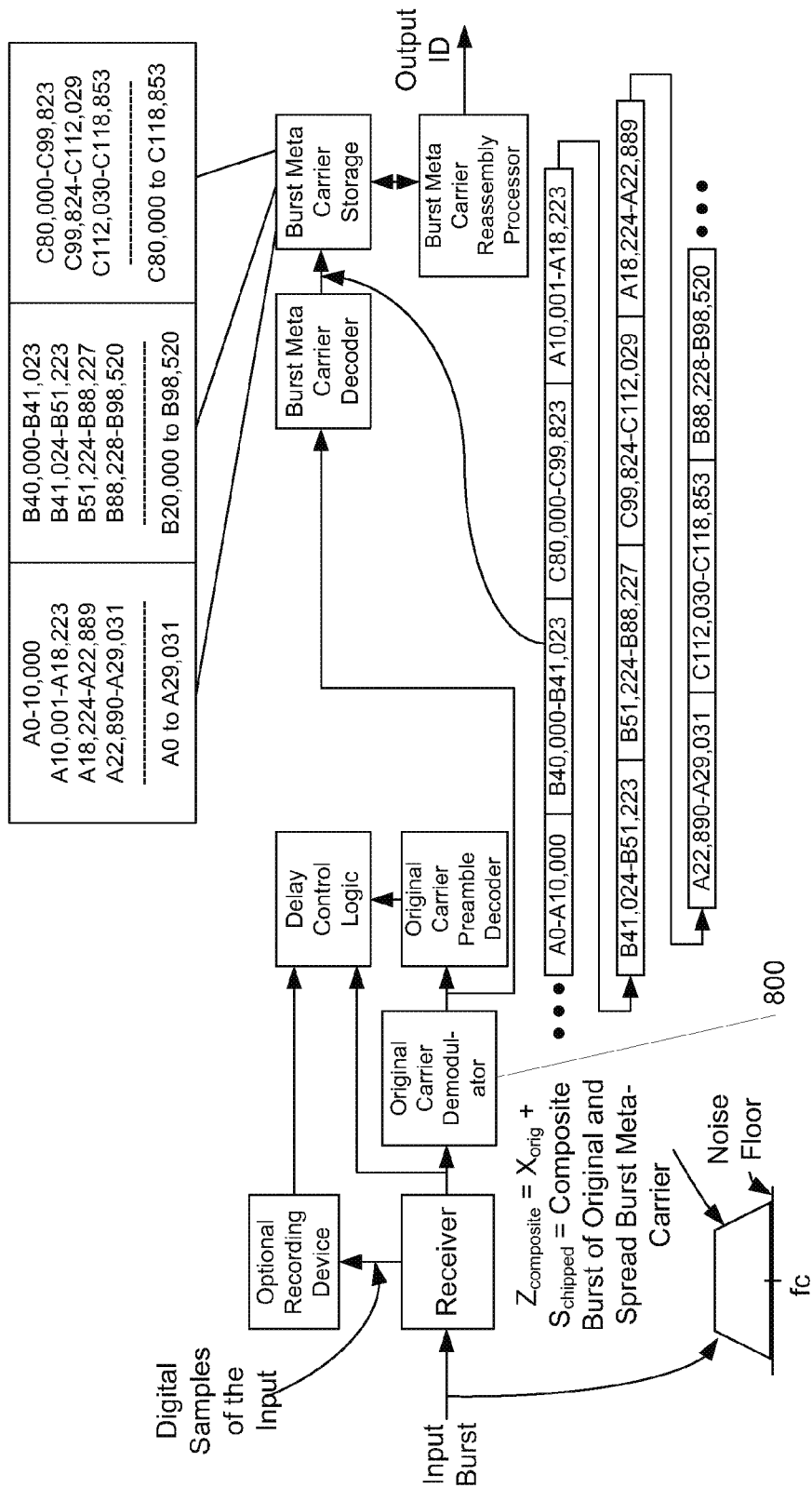

FIG. 7A demonstrates an implementation of a burst meta-carrier signal receiver. The input containing the composite carrier signal (original burst carrier signal and burst meta-carrier signal) may be received 700, converted to a digitally sampled signal 720 and optionally stored in a recording or memory device 710. First, the original burst carrier signal's preamble is decoded 730 removing the timing and phase ambiguity for the processing of the burst meta-carrier signal. The preamble may be used to direct the delay control logic 740 to direct the burst meta-carrier signal despreader 750, demodulator 760, and decoder 770 logic for decoding. Since the receiver 700 may be connected to a recording device 710, the incoming bursts may be stored, processed, and re-processed in an iterative fashion to extract the burst meta-carrier signal. The output of the burst meta-carrier decoder 770 is provided to the burst meta-carrier storage 780 where the meta-data fragments are stored for processing by the burst meta-carrier processor 790. Once a full meta-data message has been reassembled, the message may be output and memory reclaimed. FIG. 7B demonstrates an alternative embodiment in which the burst meta-carrier signal demodulation may be accomplished by the original carrier signal demodulation process 800 when the chip rate is tied to the original signal's bit rate.

Figure 9:
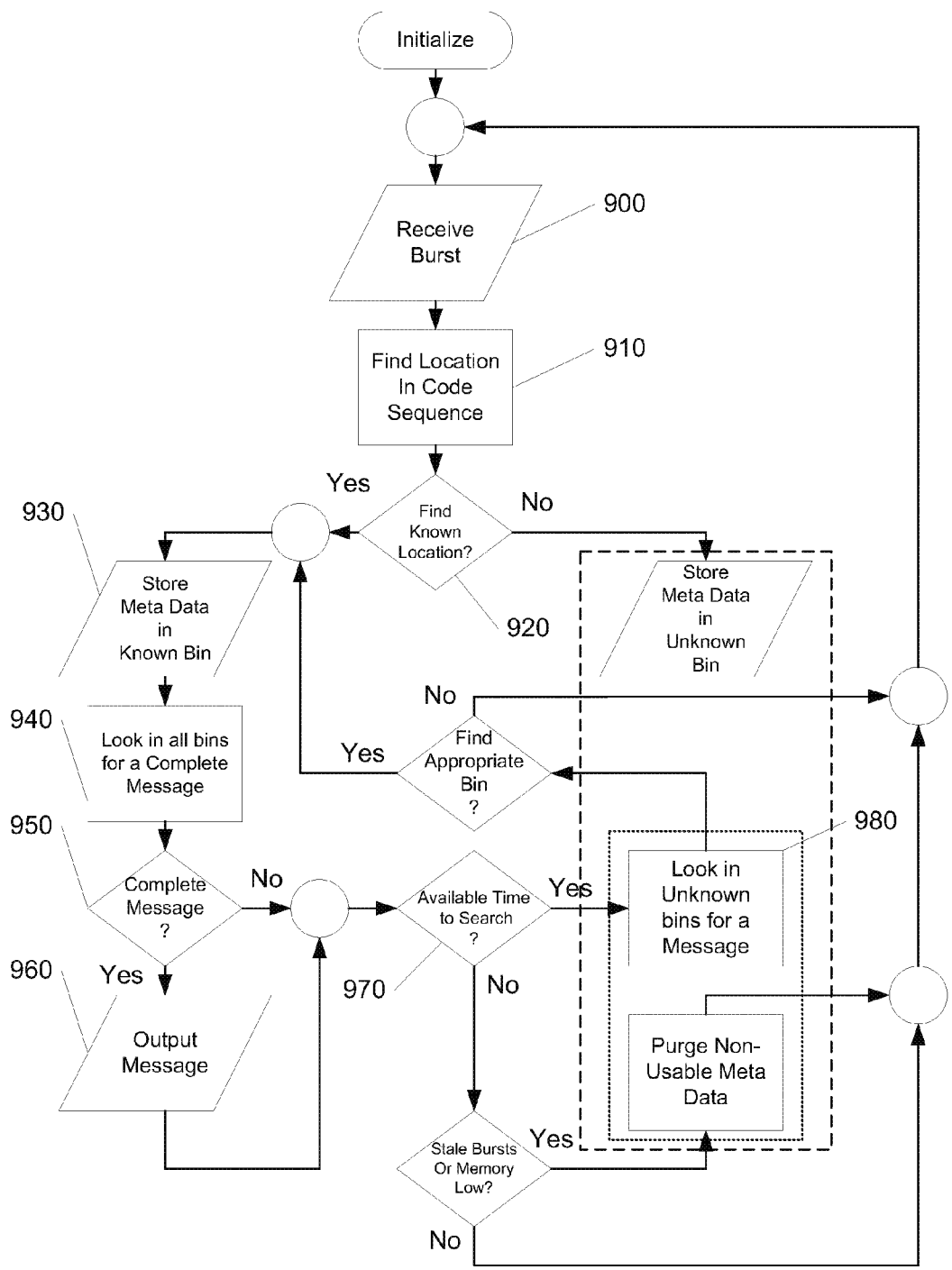
FIG. 9 is a logic flow diagram showing an implementation of a receiving device.
Figure 10:
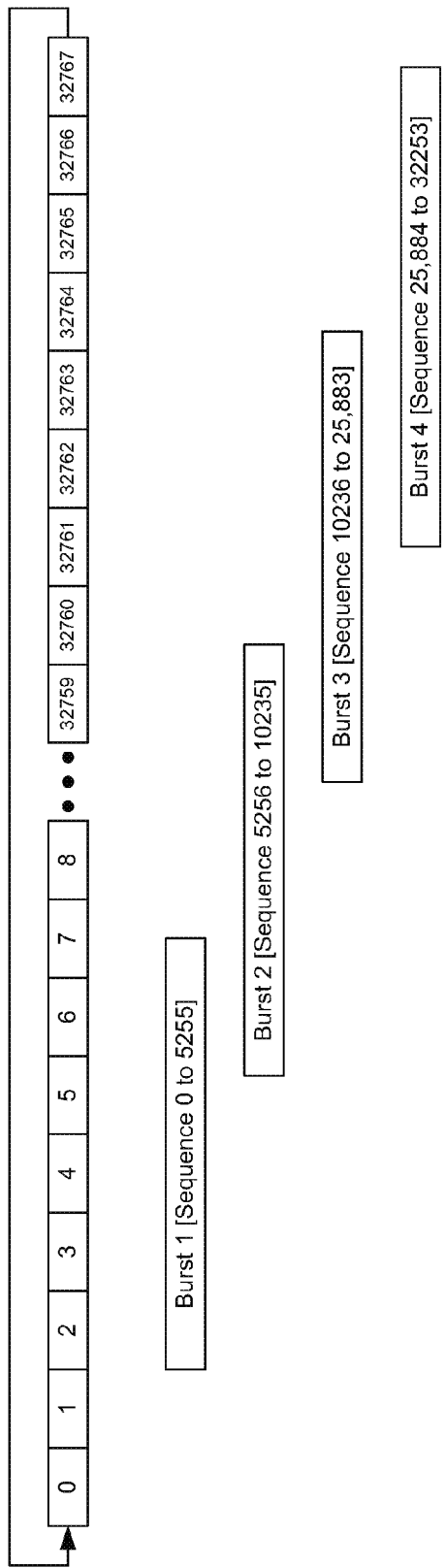
FIG. 10 is a diagram of an implementation of a sequential stepping of a PRN sequence for each burst in which a 2^15 PRN code is stepped sequentially.

FIG. 9 demonstrates an implementation of the logic flow that may be applied to the burst meta-carrier signal process using the block diagram shown in FIGS. 7A and 7B. Upon receiving a burst carrier signal 900, an attempt to identify a location in the PRN code sequence is made 910. If a known location is found 920, meta-data is stored in a known bin 930 and all bins are then checked 940 to determine whether a complete message is present 950. If so, the message is output 960. If a complete message is not found, a determination is made as to whether adequate search time remains 970 and if so, unknown bins are checked for a message 980.

The following are particular implementations of burst meta-carrier signal techniques provided as non-limiting examples.

EXAMPLE 1

A satellite burst transmit station is configured to operate in a burst format at an assigned center frequency, occupied bandwidth and power level to a satellite. For this example, the satellite burst transmit station is configured to operate with a particular method implementation using a sequential PRN sequence embedding method. In this example, the burst time planner at the hub-earth station has assigned the satellite burst transmit station enough symbols to transmit an entire meta-data message in a single burst. When the transmit opportunity is realized, the preamble of the burst carrier signal is transmitted, the burst meta-data is chipped and the burst meta-carrier signal is then created, combined, and transmitted with the original burst carrier signal's data. The meta-data continues to repeat and the PRN sequence continues to progress. The meta-data information and PRN sequence is stopped at the closure of the transmit aperture and will resume on the next transmit opportunity.

EXAMPLE 2

In particular implementations of the system described in Example 1, the satellite burst transmit station receives a burst time plan that does not allow a full meta-data message to be transmitted, but is longer than the minimum threshold under which no meta-data message is to be sent. The meta-data is transmitted as described in Example 1, but only a portion of the meta-data is transmitted. The meta-data information and PRN sequence is stopped at the closure of the transmit aperture and will resume on the next transmit opportunity.

EXAMPLE 3

In particular implementations of the system described in Example 1, the satellite burst transmit station receives a burst time plan that does not allow a full meta-data message to be transmitted and is shorter than the minimum required to transmit a meta-carrier message. In this example, no meta-carrier signal is transmitted.

EXAMPLE 4

A satellite burst transmit station is configured to operate in a burst format at an assigned center frequency, occupied bandwidth and power level to a satellite. For this example, the satellite burst transmit station is configured to operate with a particular method implementation using a stepped PRN sequence embedding method. For this example, the burst time planner at the hub-earth station has assigned the satellite burst transmit station enough symbols to transmit an entire meta-data message in a single burst. When the transmit opportunity is realized, the preamble of the burst carrier signal is transmitted, the burst meta-data is chipped and the burst meta-carrier is then created, combined, and transmitted with the original burst carrier signal's data. The meta-data continues to repeat and the PRN sequence continues to progress. The meta-data information and PRN sequence is stopped at the closure of the transmit aperture and will step forward to the assigned break point in the PRN sequence on the next transmit opportunity.

EXAMPLE 5

In particular implementations of the system described in Example 4, the satellite burst transmit station receives a burst time plan that does not allow a full meta-data message to be transmitted, but is longer than the minimum threshold under which no meta-data message is to be sent. The meta-data is transmitted as described in Example 4, but only a portion of the meta-data is transmitted. The meta-data information and PRN sequence is stopped at the closure of the transmit aperture and will step forward to the assigned break point in the PRN sequence on the next transmit opportunity.

EXAMPLE 6

In particular implementations of the system described in Example 4, the satellite burst transmit station receives a burst time plan that does not allow a full meta-data message to be transmitted and is shorter than the minimum required to transmit a meta-carrier message. In this example, no meta-carrier signal is transmitted.

EXAMPLE 7

A satellite burst transmit station is configured to operate in a burst format at an assigned center frequency, occupied bandwidth, and power level to a satellite. For this example, the satellite burst transmit station is configured to operate with a particular method implementation using the stepped PRN sequence and an offset is applied for the embedding method. In this example, the burst time planner at the hub-earth station has assigned the satellite burst transmit station enough symbols to transmit an entire meta-data message in a single burst. When the transmit opportunity is realized, the preamble of the burst carrier signal is transmitted, the burst meta-data is chipped, and the burst meta-carrier is then created, combined and transmitted with the original burst carrier signal's data. The meta-data continues to repeat and the PRN sequence continues to progress. The meta-data information and PRN sequence is stopped at the closure of the transmit aperture and will step forward to the assigned break point and an offset applied in the PRN sequence on the next transmit opportunity.

EXAMPLE 8

In particular implementations of the system described in Example 7, the satellite burst transmit station receives a burst time plan that does not allow a full meta-data message to be transmitted, but is longer than the minimum threshold under which no meta-data message is to be sent. The meta-data is transmitted as described in Example 7, but only a portion of the meta-data is transmitted. The meta-data information and PRN sequence is stopped at the closure of the transmit aperture and will step forward to the assigned break point and an offset applied in the PRN sequence on the next transmit opportunity.

EXAMPLE 9

In particular implementations of the system described in Example 7, the satellite burst transmit station receives a burst time plan that does not allow a full meta-data message to be transmitted and is shorter than the minimum required to transmit a meta-carrier message. In this example, no meta-carrier signal is transmitted.

EXAMPLE 10

A satellite burst receiving (decoding) station is configured to operate with a known center frequency and symbol rate. For this example, the satellite burst receiving station is configured to operate with a particular method implementation using the sequential PRN sequence for the embedding and reassembly method. In this example, eleven bursts are received as described in FIG. 7A. Burst 1 is from station A with sequence 0 to 10,000, then station B with sequence 40,000 to 41,023, then station C with sequence 80,000 to 99,823, then station A with sequence 10,001 to 18,223, then station B with sequence 41,024 to 51,223, with a continuation from station B with sequence 51,224 to 88,227, then station C with sequence 99,824 to 112,029, then station A with sequence 18,224 to 22,889, with a continuation from station A with sequence 22,890 to 29,031, then station C with sequence 112,030 to 118,853, and then finally station B with sequence 88,228 to 98,520. Upon receipt of the messages, the burst meta-carrier processor determines useful message information has been received from station A in sequence 0 to 29,031, then station B in sequence 20,000 to 98,520, and finally station C in sequence 80,000 to 118,853.

EXAMPLE 11

A satellite burst transmit station is configured to operate in a burst format at an assigned center frequency, occupied bandwidth and power level to a satellite. For this example, the satellite burst transmit station is configured to operate with a meta-carrier signal. At the receiving (decoding) station the burst receiving (decoding) station receives the bursts without interference in the shared TDMA channel.

EXAMPLE 12

In particular implementations of the system described in Example 11, the satellite burst transmit station is not operating properly and transmitting in a spectrum that is not assigned/approved for transmission. A burst meta-carrier signal decoding device may be used to determine the identity of the source of the improperly operating carrier signal.

EXAMPLE 13

In particular implementations of the system described in Example 11, the satellite burst transmit station is not operating properly and transmitting in a spectrum that is not assigned/approved for transmission. Additionally, the improperly operating burst transmit terminal is occupying spectrum that is being used for transmission, and the result is two burst carrier signals occupying the same spectrum, resulting in interference to the assigned user of the spectrum. A burst meta-carrier signal decoding device may be used to determine the identity of the source of the improperly operating carrier signal in an interference condition.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of receiving and reassembling non-sequential meta-data information embedded within an original burst carrier signal comprising:
   receiving, by a receiving device, multiple composite burst carrier signals, each composite burst carrier signal comprising an original burst carrier signal and a meta-carrier signal, wherein the meta-carrier signal occupies at least a portion of a bandwidth of the original burst carrier signal and comprises one or more bits of meta-data information of a meta-data message about the original burst carrier signal that is non-contiguous in reference to a temporal order in which the meta-data information is received by the receiving device;
   detecting, by a detecting device, a Direct Sequence Spread Spectrum (DSSS) spreading sequence and extracting each of the meta-carrier signals from the composite burst carrier signals;
   determining a phase progression of the meta-carrier signals based on a Pseudo-Random Noise (PRN) spreading code;
   storing the one or more bits of information from each of the meta-carrier signals in a storage device; and
   reassembling the one or more bits of meta-data information from each meta-carrier signal into a sequential order after an entire meta-data message is received and extracted from one or more subsequently received composite burst carrier signals.

2. The method of claim 1, further comprising establishing a start of each of the meta-carrier signals based on a predetermined characteristic of the corresponding original burst carrier signal.

3. The method of claim 1, further comprising generating one or more digital samples of a received meta-carrier signal using an analog to digital converter.

4. The method of claim 1, further comprising reprocessing incoming data stored by a recording device after detection of an error.

5. The method of claim 4, further comprising repetitively commanding stored incoming data to be iteratively output using a control device.

6. The method of claim 1, further comprising storing, by a storage device, received and demodulated portions of the PRN spreading code sequence.

7. The method of claim 1, further comprising determining whether at least a portion of an incoming meta-data message is available to combine with at least another portion of the incoming meta-data message using an iterative determination process.

8. The method of claim 7, further comprising outputting, by an output device, a meta-data message in response to obtaining an entire meta-data message.

9. The method of claim 1, wherein the PRN spreading code further comprises a predetermined step in the PRN spreading code sequence configured to indicate advancement to a next location in the meta-data sequence based on the predetermined step in the PRN spreading code sequence.

10. The method of claim 9, wherein the PRN spreading code further comprises a fixed offset in the PRN spreading code sequence.

11. The method of claim 1, further comprising:
searching for one or more meta-data message bit segments containing one or more errors; and
establishing a probability of reassembly of the meta-data message when the one or more errors is corrected using an iterative process.

12. The method of claim 1, further comprising using a cyclic redundancy check (CRC) to determine one or more bit errors or gaps in a received meta-data sequence.

13. The method of claim 1, wherein a chip rate of each of the meta-carrier signals is equal to a symbol rate of the original burst carrier signal.

14. The method of claim 6, further comprising verifying accuracy of a received meta-data message by referencing an external database.

15. A system for receiving and reassembling non-sequential meta-data information embedded within an original burst carrier signal comprising:
a receiving device configured to receive multiple composite burst carrier signals, each composite burst carrier signal comprising an original burst carrier signal and a meta-carrier signal, wherein the meta-carrier signal occupies at least a portion of a bandwidth of the original burst carrier signal and comprises one or more bits of meta-data information of a meta-data message about the original burst carrier signal that is non-contiguous in reference to a temporal order in which the meta-data information is received by the receiving device;
a detecting device configured to detect a Direct Sequence Spread Spectrum (DSSS) spreading sequence and extracting each of the meta-carrier signals from the composite burst carrier signals;
a first processing device configured to determining a phase progression of the meta-carrier signals based on a Pseudo-Random Noise (PRN) spreading code;
a storage device configured to store the one or more bits of information from each of the meta-carrier signals; and
a second processing device configured to reassemble the one or more bits of meta-data information from each meta-carrier signal into a sequential order after an entire meta-data message is received and extracted from one or more subsequently received composite burst carrier signals.

16. The system of claim 15, wherein the PRN spreading code is configured to establish a start of each of the meta-carrier signals based on a predetermined characteristic of the corresponding original burst carrier signal.

17. The system of claim 15, further comprising an analog to digital converter configured to generate one or more digital samples of a received meta-carrier signal.

18. The system of claim 15, wherein the processor is further configured to reprocess incoming data stored by a recording device after detection of an error.

19. The system of claim 15, further comprising a control device configured to repetitively command stored incoming data to be iteratively output.

20. The system of claim 15, further comprising a storage device configured to store received and demodulated portions of the PRN spreading code sequence.

21. The system of claim 15, wherein the processor is further configured to use an iterative determination process to determine whether at least a portion of an incoming meta-data message is available to combine with at least another portion of the incoming meta-data message.

22. The system of claim 15, further comprising an output device configured to output a meta-data message in response to obtaining an entire meta-data message.

23. The system of claim 15, wherein the PRN spreading code further comprises a predetermined step in the PRN spreading code sequence configured to establish a breakpoint in the PRN spreading code sequence to indicate advancement to a next location in the meta-data sequence.

24. The system of claim 15, wherein the PRN spreading code further comprises a fixed offset in the PRN spreading code sequence.

25. The system of claim 15, wherein the processor is further configured to search for one or more meta-data message bit segments containing one or more errors and establish a probability of reassembly of the meta-data message when the one or more errors are corrected using an iterative process.

26. The system of claim 15, wherein the processor is further configured to perform a cyclic redundancy check (CRC) to determine one or more bit errors or gaps in a received meta-data sequence.

27. The system of claim 15, wherein a chip rate of each of the meta-carrier signals is equal to a symbol rate of the original burst carrier signal.

28. The system of claim 15, wherein the processor if further configured to verify accuracy of a received meta-data message by referencing an external database.

* * * * *